US011998949B2

(12) United States Patent
Sun

(10) Patent No.: US 11,998,949 B2
(45) Date of Patent: Jun. 4, 2024

(54) ACOUSTIC TRANSDUCTION STRUCTURE AND MANUFACTURING METHOD THEREOF AND ACOUSTIC TRANSDUCER

(71) Applicants: Beijing BOE Technology Development Co., Ltd., Beijing (CN); BOE TECHNOLOGY GROUP CO., LTD., Beijing (CN)

(72) Inventor: Tuo Sun, Beijing (CN)

(73) Assignees: Beijing BOE Technology Development Co., Ltd., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 484 days.

(21) Appl. No.: 17/332,869

(22) Filed: May 27, 2021

(65) Prior Publication Data

US 2022/0134381 A1 May 5, 2022

(30) Foreign Application Priority Data

Oct. 29, 2020 (CN) ......................... 202011186613.0

(51) Int. Cl.
*B06B 1/02* (2006.01)

(52) U.S. Cl.
CPC .................................. *B06B 1/0292* (2013.01)

(58) Field of Classification Search
CPC .................................................... B06B 1/0292
See application file for complete search history.

(56) References Cited

U.S. PATENT DOCUMENTS

| | | | |
|---|---|---|---|
| 3,559,162 | A | 1/1971 | Granfors et al. |
| 2005/0200241 | A1 | 9/2005 | Degertekin |
| 2010/0268089 | A1 | 10/2010 | Degertekin |
| 2015/0016656 | A1 | 1/2015 | Chen et al. |
| 2016/0199030 | A1 | 7/2016 | Patil et al. |
| 2018/0108338 | A1 | 4/2018 | Klemm et al. |
| 2018/0226564 | A1 | 8/2018 | Itayama |
| 2019/0259932 | A1 | 8/2019 | Procopio et al. |
| 2020/0050816 | A1 | 2/2020 | Tsai |

(Continued)

FOREIGN PATENT DOCUMENTS

| | | | |
|---|---|---|---|
| CN | 102143422 | A | 8/2011 |
| CN | 104581585 | A | 4/2015 |

(Continued)

OTHER PUBLICATIONS

China Patent Office, First Office Action dated Jun. 24, 2021, for corresponding Chinese application No. 202011186613.0.

*Primary Examiner* — Naishadh N Desai
(74) *Attorney, Agent, or Firm* — HOUTTEMAN LAW LLC

(57) ABSTRACT

The present disclosure provides an acoustic transduction structure including: a base substrate and at least two acoustic transduction units on the base substrate, wherein vibrating cavities of two adjacent acoustic transduction units are spaced apart from each other in a direction parallel to a plane where the base substrate is located, and the at least two acoustic transduction units include: a central acoustic transduction unit and at least one annular acoustic transduction unit around the central acoustic transduction unit. The present disclosure also provides a method for manufacturing the acoustic transduction structure and an acoustic transducer.

14 Claims, 4 Drawing Sheets

(56) References Cited

U.S. PATENT DOCUMENTS

| | | | |
|---|---|---|---|
| 2020/0061670 A1 | 2/2020 | Chan et al. | |
| 2020/0130012 A1* | 4/2020 | Motieian Najar ..... | H10N 30/06 |
| 2020/0230650 A1* | 7/2020 | Kim ...................... | B06B 1/0696 |

FOREIGN PATENT DOCUMENTS

| | | |
|---|---|---|
| CN | 105492129 A | 4/2016 |
| CN | 208567915 U | 3/2019 |
| CN | 110518114 A | 11/2019 |
| CN | 209968843 U | 1/2020 |
| CN | 111136001 A | 5/2020 |
| GB | 1269751 A | 4/1972 |

* cited by examiner

ACOUSTIC TRANSDUCTION STRUCTURE AND MANUFACTURING METHOD THEREOF AND ACOUSTIC TRANSDUCER

CROSS REFERENCE TO RELATED APPLICATIONS

The present application claims the priority of the Chinese Patent Application No. 202011186613.0 filed on Oct. 29, 2020, the content of which is incorporated herein by reference in its entirety.

TECHNICAL FIELD

The present disclosure relates to an acoustic transduction structure and a manufacturing method thereof and an acoustic transducer.

BACKGROUND

Ultrasonic detection may be widely applied in various fields, such as medical imaging, therapy, industrial flowmeters, automotive radars, indoor positioning, and so on. An acoustic transducer is a device which may be used for the ultrasonic detection, and an acoustic transduction unit is a core component in the acoustic transducer.

SUMMARY

The present disclosure provides an acoustic transduction structure and a manufacturing method thereof and an acoustic transducer.

In a first aspect, the embodiment of the present disclosure provides an acoustic transduction structure, including: a base substrate and at least two acoustic transduction units on the base substrate, and the at least two acoustic transduction units include: a central acoustic transduction unit and at least one annular acoustic transduction unit around and spaced apart from the central acoustic transduction unit.

In some embodiments, the at least one annular acoustic transduction unit includes a plurality of annular acoustic transduction units; the plurality of annular acoustic transduction units are sequentially on the base substrate along a direction distal to the central acoustic transduction unit and around the central acoustic transduction unit.

In some embodiments, each of the at least two acoustic transduction units includes: a first electrode on the base substrate; a support pattern on a side of the first electrode distal to the base substrate, wherein the support pattern is encircled to form a vibrating cavity of the acoustic transduction unit; a vibrating diaphragm pattern on a side of the support pattern distal to the first electrode, and configured to vibrate in the vibrating cavity; and a second electrode on a side of the vibrating diaphragm pattern distal to the first electrode, and opposite to the first electrode.

In some embodiments, shapes of orthographic projections of the first electrode, the second electrode and the vibrating cavity in the central acoustic transduction unit on the base substrate are all circular, and/or shapes of orthographic projections of the first electrode, the second electrode and the vibrating cavity in each of the plurality of annular acoustic transduction units on the base substrate are all annular; the orthographic projection of the first electrode in each of the plurality of annular acoustic transduction units on the base substrate surrounds the orthographic projection of the first electrode in the central acoustic transduction unit on the base substrate; the orthographic projection of the vibrating cavity in each of the plurality of annular acoustic transduction units on the base substrate surrounds the orthographic projection of the vibrating cavity in the central acoustic transduction unit on the base substrate; and the orthographic projection of the second electrode in each of the plurality of annular acoustic transduction units on the base substrate surrounds the orthographic projection of the second electrode in the central acoustic transduction unit on the base substrate.

In some embodiments, the annular shape is a circular ring, an elliptical ring or a rectangular ring.

In some embodiments, the first electrode in the central acoustic transduction unit is in a same layer as the first electrodes in the annular acoustic transduction units; the support pattern in the central acoustic transduction unit is in a same layer as the support patterns in the plurality of annular acoustic transduction units; the vibrating diaphragm pattern in the central acoustic transduction unit is in a same layer as the vibrating diaphragm patterns in the plurality of annular acoustic transduction units; and the second electrode in the central acoustic transduction unit is in a same layer as the second electrodes in the plurality of annular acoustic transduction units.

In some embodiments, the acoustic transduction structure further includes: an insulating layer and a signal wiring layer, wherein, the signal wiring layer is between the base substrate and the first electrodes, the insulating layer is between the signal wiring layer and the first electrodes, and the insulating layer has a plurality of vias therein; the signal wiring layer includes: a plurality of signal wirings, and the first electrode of each of the at least two acoustic transducer units is connected with a corresponding one of the plurality of signal wirings through a corresponding one of the plurality of vias.

In some embodiments, the acoustic transduction structure further includes: connection electrodes connecting two second electrodes of any two adjacent acoustic transduction units of the at least two acoustic transduction units, and on a side of the vibrating diaphragm pattern distal to the first electrode.

In some embodiments, the connection electrodes are in a same layer as the second electrodes of the at least two acoustic transduction units.

In some embodiments, orthographic projections of the vibrating cavities of any two adjacent acoustic transduction units of the at least two acoustic transduction units on the base substrate are spaced apart from each other by a predetermined distance.

In some embodiments, orthographic projections of the vibrating cavities of any two adjacent acoustic transduction units of the at least two acoustic transduction units on the base substrate are spaced apart from each other by a predetermined distance.

In some embodiments, the predetermined distance d between the orthographic projections of the vibrating cavities in any two adjacent acoustic transduction units on the base substrate satisfies: $0.4\lambda \leq d \leq 0.6\lambda$, $\lambda$ is the wavelength of the acoustic wave emitted by the acoustic transduction structure.

In some embodiments, an orthographic projection of the release holes of the vibrating cavities in the central acoustic transduction unit and the plurality of annular acoustic transduction units on the base substrate and an orthographic projection of the filling patterns in the release holes on the base substrate are on a symmetrical axis of the central acoustic transduction unit and the plurality of annular acoustic transduction units, and are on a side of the vibrating cavities in the central acoustic transduction unit and the plurality of annular acoustic transduction units distal to the central acoustic transduction unit, respectively.

In some embodiments, the connection electrodes are on a symmetrical axis of the central acoustic transduction unit and the plurality of annular acoustic transduction units.

In a second aspect, the embodiment of the present disclosure provides a method for manufacturing the above acoustic transduction structure, including steps of: forming at least two acoustic transduction units on a base substrate such that the at least two acoustic transduction units include: a central acoustic transduction unit and at least one annular acoustic transduction unit around and spaced apart from the central acoustic transduction unit.

In some embodiments, the step of forming at least two acoustic transduction units on a base substrate includes steps of: forming a first central electrode and at least one first annular electrode around and spaced apart from the first central electrode on the base substrate, wherein the first central electrode and the at least one first annular electrode are first electrodes in the central acoustic transduction unit and the at least one annular acoustic transduction unit, respectively, and the at least one first annular electrode is spaced apart from each other in a direction distal to the first central electrode; forming a support pattern and a vibrating diaphragm pattern on a side of the first central electrode and the at least one first annular electrode distal to the base substrate, wherein the support pattern is encircled to form a central vibrating cavity and at least one annular vibrating cavity around the central vibrating cavity, and the central vibrating cavity and the at least one annular vibrating cavity are respectively vibrating cavities in the central acoustic transduction unit and the at least one annular acoustic transduction unit; and forming a second central electrode and at least one second annular electrode around the second central electrode on a side of the vibrating diaphragm pattern distal to the base substrate, wherein the second central electrode and the at least one second annular electrode are respectively second electrodes in the central acoustic transduction unit and the at least one annular acoustic transduction unit.

In some embodiments, while forming a second central electrode and at least one second annular electrode around the second central electrode on a side of the vibrating diaphragm pattern distal to the base substrate, the manufacturing method further includes forming connection electrodes, wherein the connection electrodes connect two second electrodes of any adjacent two of the at least two acoustic transduction units.

In some embodiments, the step of forming a support pattern and a vibrating diaphragm pattern on a side of the first central electrode and the at least one first annular electrode distal to the base substrate includes steps of: forming a plurality of sacrificial patterns on a side of the first central electrode and the at least one first annular electrode distal to the base substrate; forming a support and vibrating diaphragm material film on a side of the plurality of sacrificial patterns and on a surface of the plurality of sacrificial patterns distal to the base substrate, and performing a patterning process on the support and vibrating diaphragm material film to form a plurality of support patterns and a plurality of vibrating diaphragm patterns; forming a plurality of release holes of the central acoustic transduction unit and the at least one annular acoustic transduction unit on the plurality of vibrating diaphragm patterns, respectively; removing the sacrificial patterns via the plurality of release holes to obtain vibrating cavities of the central acoustic transduction unit and the at least one annular acoustic transduction unit; and forming filling patterns in the plurality of release holes to seal the vibrating cavities of the central acoustic transduction unit and the at least one annular acoustic transduction unit.

In some embodiments, the step of forming a support pattern and a vibrating diaphragm pattern on a side of the first central electrode and the at least one first annular electrode distal to the base substrate includes steps of: forming a plurality of sacrificial patterns on a side of the first central electrode and the at least one first annular electrode distal to the base substrate; forming a support material film on a side of the plurality of sacrificial patterns, and performing a patterning process on the support material film to obtain a plurality of support patterns; forming a vibrating material film on a surface of the plurality of sacrificial patterns distal to the base substrate, and performing a patterning process on the vibrating material film to obtain a plurality of vibrating pattern; forming a plurality of release holes of the central acoustic transduction unit and the at least one annular acoustic transduction unit on the plurality of vibrating diaphragm patterns, respectively; removing the sacrificial patterns via the plurality of release holes to obtain vibrating cavities of the central acoustic transduction unit and the at least one annular acoustic transduction unit; and forming filling patterns in the plurality of release holes to seal the vibrating cavities of the central acoustic transduction unit and the at least one annular acoustic transduction unit.

In a third aspect, the embodiment of the present disclosure provides an acoustic transducer, including: the acoustic transduction structure of the first aspect.

DETAIL DESCRIPTION OF EMBODIMENTS

To enable one of ordinary skill in the art to better understand technical solutions of the present disclosure, an acoustic transduction structure and a manufacturing method thereof and an acoustic transducer according to the present disclosure will be further described in detail below with reference to the accompanying drawings.

In the following embodiments, a case is described as an example where the acoustic wave is an ultrasonic wave, wherein the ultrasonic wave refers to an acoustic wave having a frequency of 20 kHz to 1 GHz. Alternatively, the technical solution of the present disclosure is also applicable to acoustic waves having other frequencies.

Figure 1:
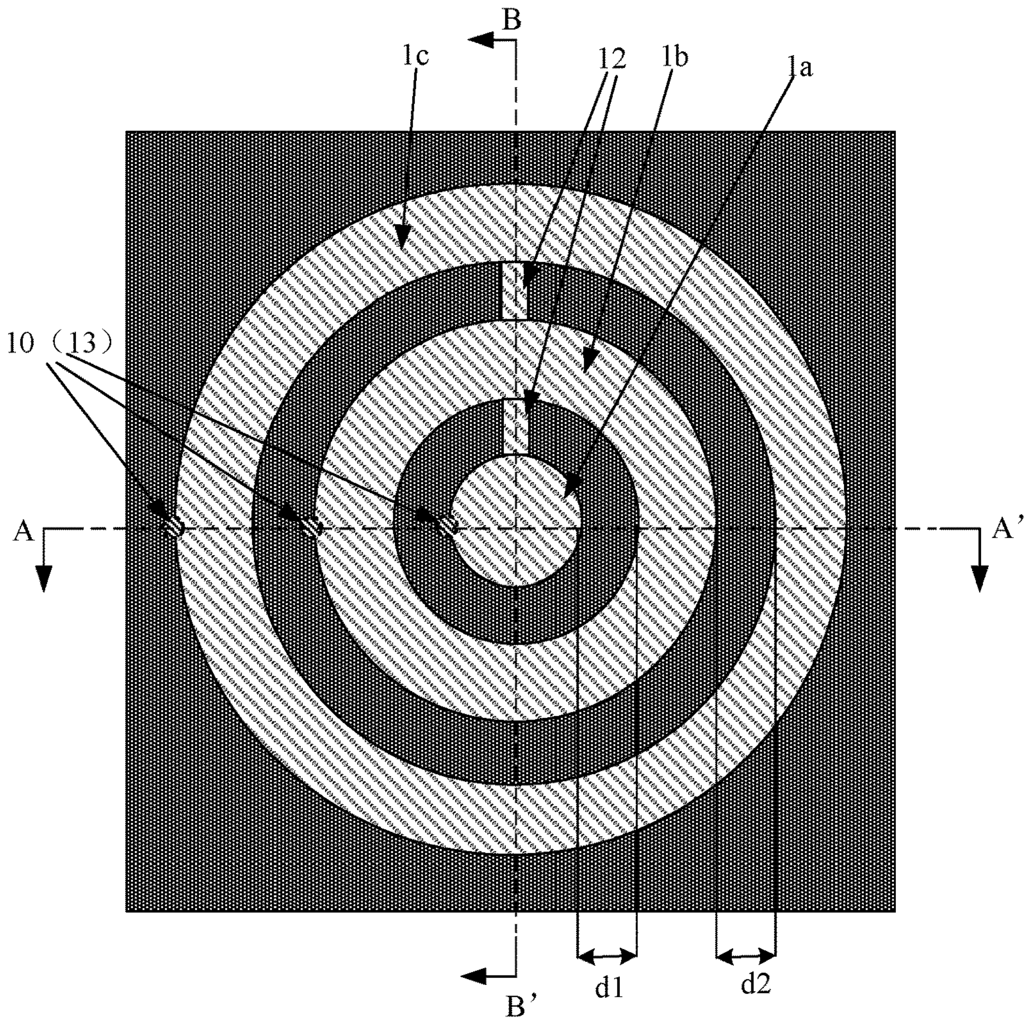
FIG. 1 is a schematic top diagram of an acoustic transduction structure according to an embodiment of the present disclosure.
Figure 2A:
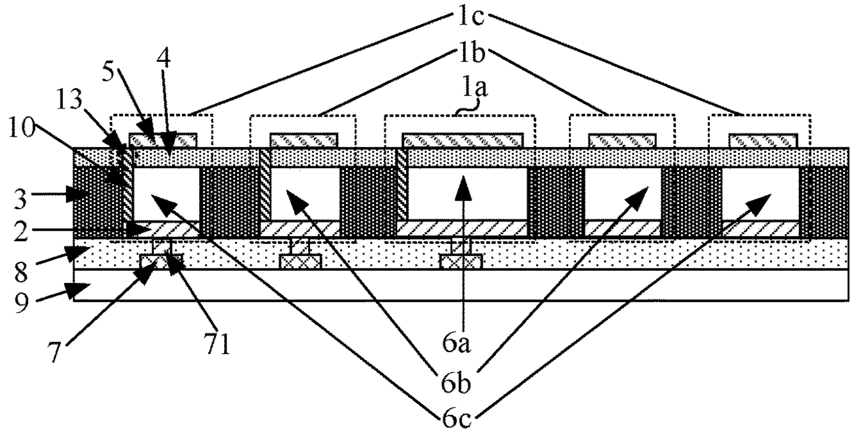
FIG. 2*a* is a schematic cross-sectional diagram of the acoustic transduction structure taken along a line A-A' of FIG. 1.
Figure 2B:
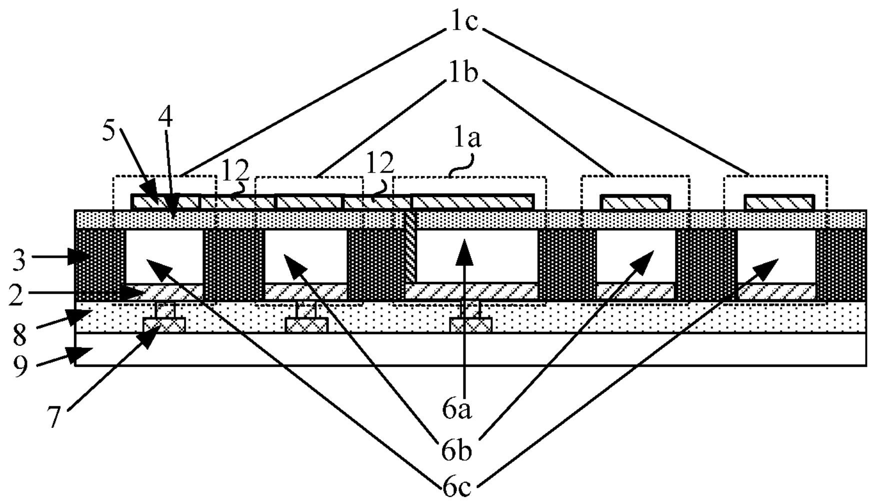
FIG. 2*b* is a schematic cross-sectional diagram of the acoustic transduction structure taken along a line B-B' of FIG. 1.

FIG. 1 is a schematic top diagram of an acoustic transduction structure according to an embodiment of the present disclosure. FIG. 2*a* is a schematic cross-sectional diagram of the acoustic transduction structure taken along a line A-A' of FIG. 1. FIG. 2*b* is a schematic cross-sectional diagram of the acoustic transduction structure taken along a line B-B' of FIG. 1. As shown in FIGS. 1 to 2B, the acoustic transduction structure includes: a base substrate 9 and at least two acoustic transduction units located on the base substrate 9; wherein vibrating cavities 6*a*, 6*b* and 6*c* in the adjacent acoustic transduction units are spaced apart from each other in a direction parallel to a plane where the base substrate 9 is located; and the at least two acoustic transduction units include: a central acoustic transduction unit 1*a* and at least one annular acoustic transduction unit 1*b*, 1*c* provided around the central acoustic transduction unit 1*a*.

In the embodiment of the present disclosure, operating states of the central acoustic transduction unit 1*a* and the annular acoustic transduction units 1*b* and 1*c* may be controlled respectively. The operating states of the acoustic transduction units are changed such that the energy distribution of ultrasonic waves emitted by the acoustic transduction structure may be changed, and thus, the acoustic transduction structure may be applied to different application scenarios.

In the current field, a "radiation plot" is generally used to describe the energy distribution of ultrasonic waves emitted by the acoustic transduction structure. The radiation plot is used to describe the intensity (generally represented by a sound pressure level in dB) of the ultrasonic waves emitted by the acoustic transduction unit in different directions (generally represented by an angle).

FIG. 1 and FIGS. 2*a* and 2*b* only exemplarily show a case where the acoustic transduction structure includes two annular acoustic transduction units 1*b* and 1*c*, which is merely an exemplary case and does not limit the technical solution of the present disclosure. In embodiments of the present disclosure, the acoustic transduction structure may include one, three or more annular acoustic transduction units.

In some embodiments, the acoustic transduction structure includes a plurality of annular acoustic transduction units sequentially disposed on the base substrate and around the central acoustic transduction unit and spaced apart from each other. As shown in FIGS. 1 and 2 as an example, the acoustic transduction structure includes two annular acoustic transduction units 1*b*, 1*c*, wherein the annular acoustic transduction unit 1*c* with a large size surrounds and is disposed spaced apart from the annular acoustic transduction unit 1*b* with a small size. When the acoustic transduction structure includes more than two annular acoustic transduction units, the annular acoustic transduction units are sequentially disposed around the central acoustic transduction unit from the inside to the outside (in a direction distal to the central transduction unit) in an order of increasing size and spaced apart from each other.

In some embodiments, each of the acoustic transduction units may be a capacitive micro-machined ultrasonic transduction unit. As an alternative embodiment, the capacitive micro-machined ultrasonic transduction unit (each of the acoustic transduction units) includes: a first electrode 2, a support pattern 3, a vibrating diaphragm pattern 4 and a second electrode 5. The first electrode 2 is located on the base substrate 9; the support pattern 3 is located on a side of the first electrode 2 distal to the base substrate 9 and is encircled to form vibrating cavities 6*a*, 6*b* and 6*c* therein; the vibrating diaphragm pattern 4 is located on a side of the support pattern 3 distal to the first electrode 2 and may vibrate in the vibrating cavities 6*a*, 6*b* and 6*c*; the second electrode 5 is located on a side of the vibrating diaphragm pattern 4 distal to the first electrode 2 and is opposite to the first electrode 2.

When ultrasonic detection is performed, the acoustic transduction unit is in an emitting state firstly, and then is switched to a receiving state.

When the acoustic transduction unit is in the emitting state, a forward direct current bias voltage VDC (i.e., the pull-in operating voltage) is loaded across the second electrode 5 and the first electrode 2, such that a capacitor is formed between the first electrode 2 and the second electrode 5, and the vibrating diaphragm pattern 4 is bent and deformed downward (a side proximal to the first electrode 2) under the electrostatic action. On this basis, an alternating voltage VAC of a frequency f (a magnitude of f is set according to actual requirement) is applied across the second electrode 5 and the first electrode 2, so that the vibrating diaphragm pattern 4 is excited to reciprocate greatly (reciprocate in the direction proximal to the first electrode 2 and in a direction distal to the first electrode 2), realizing the conversion of electric energy into mechanical energy. The vibrating diaphragm pattern 4 radiates energy to the medium environment, generating ultrasonic waves. Some ultrasonic waves may be reflected on a surface of an object to be detected and return to the acoustic transduction unit, and be received and detected by the acoustic transduction unit.

When the acoustic transduction unit is in the receiving state, only the direct current bias voltage (i.e., the pull-in operating voltage) is loaded across the second electrode 5 and the first electrode 2, such that the vibrating diaphragm pattern 4 reaches a static balance under the action of an electrostatic force and a membrane restoring force. When acoustic waves act on the vibrating diaphragm pattern 4, the vibrating diaphragm pattern 4 is excited to vibrate, such that a cavity pitch between the second electrode 5 and the first electrode 2 changes, causing a change in the inter-plate capacitance, thereby generating a detectable electrical signal. Detection of the received ultrasonic waves may be achieved based on the electrical signal.

It should be noted that, in the process of manufacturing the support pattern 3 and the vibrating diaphragm pattern 4 of the capacitive micro-machined ultrasonic transduction unit, firstly, a sacrificial pattern is formed in a region where the vibrating cavities 6*a*, 6*b*, 6*c* are located, and release holes 13 are formed on the vibrating diaphragm pattern 4. In the subsequent process, the sacrificial pattern is removed through the release holes 13 to obtain the vibrating cavities 6*a*, 6*b*, 6*c*, and the release holes 13 are filled with the filling patterns 10 to seal the vibrating cavities 6*a*, 6*b*, 6*c*. As shown in FIG. 1, an orthographic projection of the central acoustic transduction unit 1*a* on the base substrate 9 is circular, and the annular acoustic transduction units 1*b* and 1*c* are sequentially provided at predetermined intervals along a direction distal to the central acoustic transduction unit 1*a*. As shown in FIG. 1, an AA 'line and a BB' line may be regarded as symmetry axes of the central acoustic transduction unit 1*a* and the annular acoustic transduction units 1*b*, 1*c*, and an intersection point between the AA 'line and the BB' line may be regarded as a center of the acoustic transduction structure. The release hole 13 and the filling pattern 10 of the vibrating cavities of the central acoustic transduction unit 1*a* and the release holes 13 and the filling patterns 10 of the vibrating cavities of the annular acoustic transduction units 1*b*, 1*c* shown in FIG. 1 are located on a same symmetry axis and are located on a side of each acoustic transduction unit distal to the center, as shown in FIG. 1.

In the embodiment of the present disclosure, since the vibrating cavities 6_a_, 6_b_, 6_c_ of the acoustic transduction units are independent from each other, each of the vibrating cavities 6_a_, 6_b_, 6_c_ of each acoustic transduction unit are provided with at least one corresponding release hole 13 to remove the sacrificial patterns located in the corresponding vibrating cavities 6_a_, 6_b_, 6_c_ through the release holes 13. Referring to FIG. 2, each of the vibrating cavities 6_a_, 6_b_, 6_c_ of the acoustic transduction units 1_a_, 1_b_, 1_c_ is provided with a corresponding one of the release holes 13. For the specific processes of forming the release holes, removing the sacrificial patterns, and filling the release holes with the filling patterns, reference may be made to the following detailed description of the method for manufacturing the acoustic transduction structure.

It should be noted that it is only one example where the above acoustic transduction unit is the capacitive micro-machined ultrasonic transduction unit, which does not limit the technical solution of the present disclosure. The acoustic transduction unit in the present disclosure may have other structures. For example, any existing structure of the acoustic transduction unit may be adopted.

In some embodiments, shapes of orthographic projections of the first electrode 2, the second electrode 5 and the vibrating cavity 6_a_ in the central acoustic transduction unit 1_a_ on the base substrate 9 are all circular.

Figure 3:
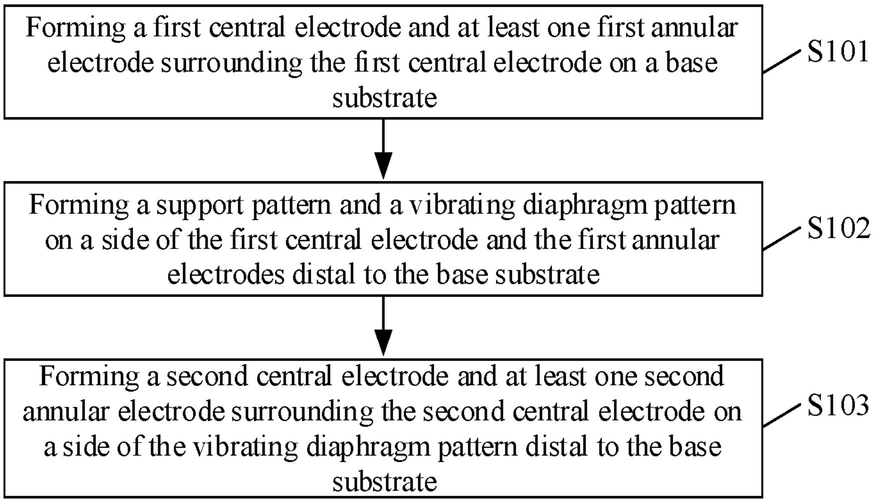
FIG. 3 is a flowchart of a method for manufacturing an acoustic transduction structure according to an embodiment of the present disclosure.

In some embodiments, shapes of orthographic projections of the first electrode 2, the second electrode 5 and the vibrating cavity 6_b_ or 6_c_ in each of the annular acoustic transduction units 1_b_ and 1_c_ on the base substrate 9 are all annular; the orthographic projection of the first electrode 2 in each of the annular acoustic transduction units 1_b_, 1_c_ on the base substrate 9 surrounds the orthographic projection of the first electrode 2 in the central acoustic transduction unit 1_a_ on the base substrate 9; an orthographic projection of each of the vibrating cavity 6_b_ in the annular acoustic transduction unit 1_b_ and the vibrating cavity 6_c_ in the annular acoustic transduction unit 1_c_ on the base substrate 9 surrounds an orthographic projection of the vibrating cavity 6_a_ in the central acoustic transduction unit 1_a_ on the base substrate 9; the orthographic projection of the second electrode 5 in each of the annular acoustic transduction units 1_b_, 1_c_ on the base substrate 9 surrounds the orthographic projection of the second electrode 5 in the central acoustic transduction unit 1_a_ on the base substrate 9. When the acoustic transduction structure includes two annular acoustic transduction units 1_b_, 1_c_ as shown in FIGS. 2 and 3, the annular acoustic transduction unit 1_b_ closer to the central acoustic transduction unit 1_a_ is referred to as a first annular acoustic transduction unit 1_b_, and the annular acoustic transduction unit 1_c_ farther away from the central acoustic transduction unit 1_a_ than the first annular acoustic transduction unit 1_b_ is referred to as a second annular acoustic transduction unit. In the embodiment shown in FIGS. 2 and 3, the orthographic projection of the first electrode 2 of the first annular acoustic transduction unit 1_b_ on the base substrate 9 surrounds the orthographic projection of the first electrode 2 of the central acoustic transduction unit 1_a_ on the base substrate 9, and the orthographic projection of the first electrode 2 of the second annular acoustic transduction unit 1_c_ on the base substrate 9 surrounds the orthographic projection of the first electrode 2 of the first annular acoustic transduction unit 1_b_ on the base substrate 9; the orthographic projection of the vibrating cavity 6_b_ of the first annular acoustic transduction unit 1_b_ on the base substrate 9 surrounds the orthographic projection of the vibrating cavity 6_a_ of the central acoustic transduction unit 1_a_ on the base substrate 9, and the orthographic projection of the vibrating cavity 6_c_ of the second annular acoustic transduction unit 1_c_ on the base substrate 9 surrounds the orthographic projection of the vibrating cavity 6_b_ of the first annular acoustic transduction unit 1_b_ on the base substrate 9; the orthographic projection of the second electrode 5 of the first annular acoustic transduction unit 1_b_ on the base substrate 9 surrounds the orthographic projection of the second electrode 5 of the central acoustic transduction unit 1_a_ on the base substrate 9, and the orthographic projection of the second electrode 5 of the second annular acoustic transduction unit 1_c_ on the base substrate 9 surrounds the orthographic projection of the second electrode 5 of the first annular acoustic transduction unit 1_b_ on the base substrate 9.

In some embodiments, the above annular shape is circular ring.

In the above embodiment, shapes of orthographic projections of the first electrode 2, the second electrode 5 and the vibrating cavity 6_a_ in the central acoustic transduction unit 1_a_ on the base substrate 9 are circular, and the shapes of orthographic projections of the first electrode 2, the second electrode 5 and the vibrating cavities 6_b_ and 6_c_ in each of the annular acoustic transduction units 1_b_ and 1_c_ on the base substrate 9 are circular ring. However, the present disclosure is not limited thereto. In the embodiment of the present disclosure, shapes of cross sections of the first electrodes 2, the second electrodes 5 and the vibrating cavities 6_a_, 6_b_, 6_c_ in the central acoustic transduction unit 1_a_ and the annular acoustic transduction units 1_b_, 1_c_ in a plane parallel to the base substrate 9 (i.e., shapes of the orthographic projections of the first electrodes 2, the second electrodes 5 and the vibrating cavities 6_a_, 6_b_, 6_c_ in the central acoustic transduction unit 1_a_ and the annular acoustic transduction units 1_b_, 1_c_ on the base substrate 9) may also be other shapes. For example, shapes of cross sections of the first electrode 2, the second electrode 5 and the vibrating cavity 6_a_ in the central acoustic transduction unit 1_a_ in a plane parallel to the base substrate 9 (i.e., shapes of the orthographic projections of the first electrode 2, the second electrode 5 and the vibrating cavity 6_a_ in the central acoustic transduction unit 1_a_ on the base substrate 9) are elliptical shapes, and shapes of cross sections of the first electrodes 2, the second electrodes 5 and the vibrating cavities 6_b_, 6_c_ in the annular acoustic transduction units 1_b_, 1_c_ in a plane parallel to the base substrate 9 (i.e., shapes of the orthographic projections of the first electrodes 2, the second electrodes 5 and the vibrating cavities 6_b_, 6_c_ in the annular acoustic transduction units 1_b_, 1_c_ on the base substrate 9) are elliptical shapes. Alternatively, shapes of cross sections of the first electrode 2, the second electrode 5 and the vibrating cavity 6_a_ in the central acoustic transduction unit 1_a_ in a plane parallel to the base substrate 9 (i.e., shapes of the orthographic projections of the first electrode 2, the second electrode 5 and the vibrating cavity 6_a_ in the central acoustic transduction unit 1_a_ on the base substrate 9) are rectangular shapes, and shapes of cross sections of the first electrodes 2, the second electrodes 5 and the vibrating cavities 6_b_, 6_c_ in the annular acoustic transduction units 1_b_, 1_c_ in a plane parallel to the base substrate 9 (i.e., shapes of the orthographic projections of the first electrodes 2, the second electrodes 5 and the vibrating cavities 6_b_, 6_c_ in the annular acoustic transduction units 1_b_, 1_c_ on the base substrate 9) are rectangular shapes. Other cases are not described in detail here.

In the embodiment of the present disclosure, when the at least two acoustic transduction units included in the acoustic transduction structure simultaneously emit the ultrasonic waves, the ultrasonic waves emitted by the at least two acoustic transduction units are superposed; because radiation plots for the ultrasonic waves emitted respectively by the central acoustic transduction unit 1_a_ and the annular acoustic transduction units 1_b_ and 1_c_ are different, when the ultrasonic waves are emitted, the ultrasonic waves may be emitted by selecting the combination of different acoustic transduction units, so that the acoustic transduction structure may generate different radiation plots. That is, adjustment of the energy distribution of the ultrasonic waves emitted by the acoustic transduction structure is realized. In addition, when ultrasonic waves are received, ultrasonic waves are received by selecting a combination of different acoustic transduction units, thereby adjusting an ultrasonic wave reception direction. For example, the acoustic transduction structure employs directional emission when emitting ultrasonic waves, and employs omnidirectional reception when receiving ultrasonic waves. Alternatively, the acoustic transduction structure employs omnidirectional emission when emitting ultrasonic waves and employs directional reception when receiving ultrasonic waves. It may be seen that the acoustic transduction structure provided by the embodiment of the present disclosure may be applied to different application scenarios by independently controlling the emission and/or reception of the central acoustic transduction unit and the annular acoustic transduction units.

In addition, in the embodiment of the present disclosure, because a size of the annular acoustic transduction unit is large, a tolerance to process deviation is increased, which facilitates to improve the yield of a production line.

In some embodiments, the first electrode 2 in the central acoustic transduction unit 1_a_ is disposed in a same layer as the first electrodes 2 in the annular acoustic transduction units 1_b_, 1_c_; the support pattern 3 in the central acoustic transduction unit 1_a_ is disposed in a same layer as the support patterns 3 in the annular acoustic transduction units 1_b_ and 1_c_; the vibrating diaphragm pattern 4 in the central acoustic transduction unit 1_a_ is disposed in a same layer as the vibrating diaphragm patterns 4 in the annular acoustic transduction units 1_b_ and 1_c_; the second electrode 5 in the central acoustic transduction unit 1_a_ is provided in a same layer as the second electrodes 5 in the annular acoustic transduction units 1_b_, 1_c_. At this time, the central acoustic transduction unit 1_a_ and the annular acoustic transduction units 1_b_ and 1_c_ may be simultaneously manufactured based on a same process for manufacturing an acoustic transduction unit, which is beneficial to reducing the production process and shortening the production cycle.

In some embodiments, the acoustic transduction structure further includes: an insulating layer 8 and a signal wiring layer; the signal wiring layer is located between the base substrate 9 and the first electrodes 2, the insulating layer 8 is located between the signal wiring layer and the first electrodes 2, and a plurality of vias 71 are formed in the insulating layer 8; the signal wiring layer includes: a plurality of signal wirings 7, and the first electrode 2 in each acoustic transduction unit is connected with a corresponding signal wiring 7 through a corresponding via 71. In the embodiment of the present disclosure, through different signal wirings 7, signals may be provided to different first electrodes 2 or electrical signals generated by different first electrodes 2 may be read for ultrasonic detection.

In some embodiments, the acoustic transduction structure further includes: connection electrodes 12 connected to the second electrodes 5, as shown in FIG. 2_b_, the connection electrodes 12 are located on a side of the vibrating diaphragm pattern 4 distal to the first electrode 2, and a plurality of second electrodes 5 located in the same acoustic transduction structure may be electrically connected through the connection electrodes 12 to form a common electrode. As shown in FIG. 1, the connection electrode 12 between each two adjacent acoustic transduction units of the acoustic transduction structure is also located on the symmetry axis of the acoustic transduction structure.

In some embodiments, the connection electrodes 12 are disposed in a same layer as the second electrodes 5, and the connection electrodes 12 are disposed between and connected to two adjacent second electrodes 5. That is, the connection electrodes 12 and the plurality of second electrodes 5 may be manufactured in the same manufacturing process, and thus, an additional process for manufacturing the connection electrodes is not required, which is beneficial to shortening the production cycle.

In some embodiments, the vibrating cavities 6 in any two adjacent acoustic transduction units are equally spaced in a direction parallel to the plane in which the base substrate 9 is located (i.e., orthogonal projections of these vibrating cavities 6 on the base substrate 9 are equally spaced). As shown in FIG. 1, a distance D1 between orthographic projections of the central acoustic transduction unit 1_a_ and the first annular acoustic transduction unit 1_b_ on the base substrate 9 is equal to a distance D1 between orthographic projections of the first annular acoustic transduction unit 1_b_ and the second annular acoustic transduction unit 1_c_ on the base substrate 9.

In some embodiments, within a same acoustic transduction structure, a distance d (e.g., d1 or d2 shown in FIG. 1) between the vibrating cavities of any two adjacent acoustic transduction units (e.g., between the vibrating cavity 6_a_ of the central acoustic transduction unit 1_a_ and the vibrating cavity 6_b_ of the annular acoustic transduction unit 1_b_, or between the vibrating cavity 6_b_ of the annular acoustic transduction unit 1_b_ and the vibrating cavity 6_c_ of the annular acoustic transduction unit 1_c_, as shown in FIGS. 2_a_ and 2_b_) in the direction parallel to the plane where the base substrate 9 is located satisfies: $0.4\lambda \le d \le 0.6\lambda$, $\lambda$ is the wavelength of the acoustic wave emitted by the acoustic transduction structure, and the value of $\lambda$ may be preset according to actual needs. In this arrangement, the resonance of ultrasonic waves emitted by any two acoustic transduction units in the acoustic transduction structure is facilitated, and the energy superposition is realized.

The embodiment of the present disclosure also provides an acoustic transducer, which includes an acoustic transduction structure, which is the acoustic transduction structure provided in any of the previous embodiments. The detailed description of the acoustic transduction structure is omitted herein.

The acoustic transducer according to the embodiment of the present disclosure includes the acoustic transduction structure provided in any of the previous embodiments, and thus has the same beneficial technical effects.

The embodiment of the present disclosure further provides a method for manufacturing an acoustic transduction structure, which may be used to manufacture the acoustic transduction structure provided in any of the foregoing embodiments, and the method includes steps of: forming at least two acoustic transduction units on a base substrate, wherein vibrating cavities in the adjacent acoustic transduction units are spaced apart from each other in a direction parallel to a plane where the base substrate is located (orthographic projections of the vibrating cavities in the adjacent acoustic transduction units on the base substrate are spaced apart from each other); and the at least two acoustic transduction units include: a central acoustic transduction unit and at least one annular acoustic transduction units around the central acoustic transduction unit 1*a*.

In the embodiment of the present disclosure, when the ultrasonic waves are emitted, the ultrasonic waves may be emitted by selecting the combination of different acoustic transduction units, so that the acoustic transduction structure may generate different radiation plots. That is, adjustment of the energy distribution of the ultrasonic waves emitted by the acoustic transduction structure is realized. In addition, when ultrasonic waves are received, ultrasonic waves are received by selecting a combination of different acoustic transduction units, thereby adjusting an ultrasonic wave reception direction. Therefore, the acoustic transduction structure provided by the embodiment of the present disclosure may be suitable for different application scenarios.

FIG. 3 is a flowchart of a method for manufacturing an acoustic transduction structure according to an embodiment of the present disclosure; FIGS. 4*a* to 4*g* are schematic cross-sectional diagrams of intermediate products for manufacturing an acoustic transduction structure using the manufacturing method shown in FIG. 3. As shown in FIGS. 3 to 4*g*, the manufacturing method may be used for manufacturing the acoustic transduction structure shown in FIGS. 1 and 2, and include steps of:

Step S101, forming a first central electrode and at least one first annular electrode surrounding the first central electrode on a base substrate.

Figure 4A:
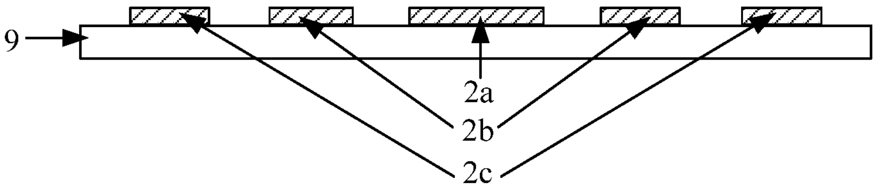
FIGS. 4*a* to 4*g* are schematic cross-sectional diagrams of intermediate products for manufacturing an acoustic transduction structure using the manufacturing method shown in FIG. 3.

Referring to FIG. 4*a*, firstly, a first conductive material film is formed on the base substrate 9, and then a patterning process is performed on the first conductive material film to obtain a pattern of the first central electrode 2*a* and first annular electrodes 2*b*, 2*c* which are discrete and spaced apart from each other. It should be noted that drawings only exemplarily show a case where two first annular electrodes are formed.

The patterning process in the embodiment of the present disclosure is also referred to as a pattern process, and specifically includes process steps, such as photoresist coating, exposure, development, thin film etching, photoresist stripping, and the like. In some embodiments, the patterned film itself is a photoresist, so that the patterning may be completed only by the steps of exposure and development.

In this embodiment, the first central electrode 2*a* and the first annular electrodes 2*b*, 2*c* are the first electrodes in the central acoustic transduction unit and the ring acoustic transduction unit, respectively. The first annular electrode 2*c* is disposed around the first annular electrode 2*b*, and the two first annular electrodes 2*b*, 2*c* are spaced apart from each other by a predetermined distance on the base substrate 9.

It should be noted that, in some embodiments, a signal wiring layer pattern and a corresponding insulating layer are further formed before the first central electrode 2*a* and the first annular electrodes 2*b* and 2*c* are formed, and a plurality of vias are formed on the insulating layer, so that the first central electrode 2*a* and the first annular electrodes 2*b* and 2*c* are electrically connected with the signal wirings in the signal wiring layer through the corresponding vias, as shown in FIGS. 2*a* and 2*b*.

S102, forming a support pattern and a vibrating diaphragm pattern on a side of the first central electrode and the first annular electrodes distal to the base substrate, wherein the support pattern is encircled to form a central vibrating cavity and annular vibrating cavities surrounding the central vibrating cavity, and the central vibrating cavity and the annular vibrating cavities are respectively vibrating cavities in the central acoustic transduction unit and the annular acoustic transduction units.

Figure 4B:
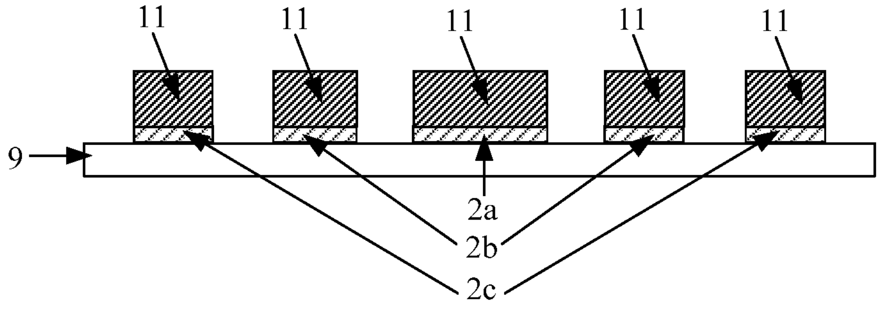
Figure 4C:
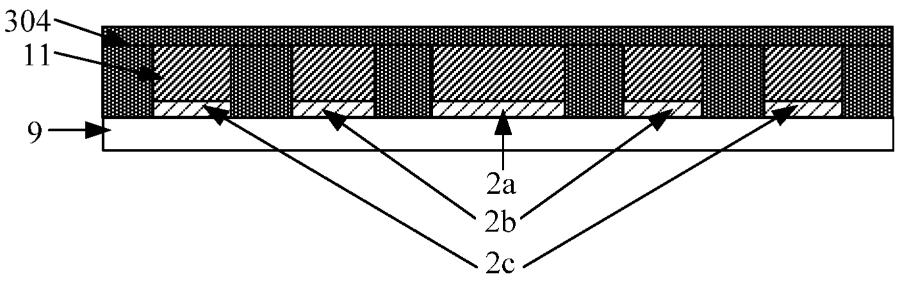
Figure 4D:
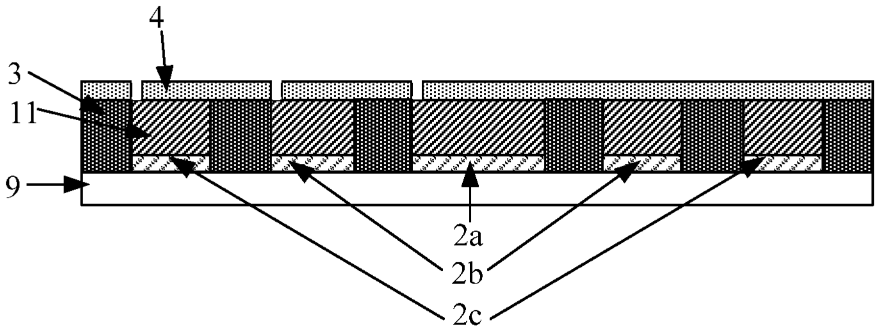
Figure 4E:
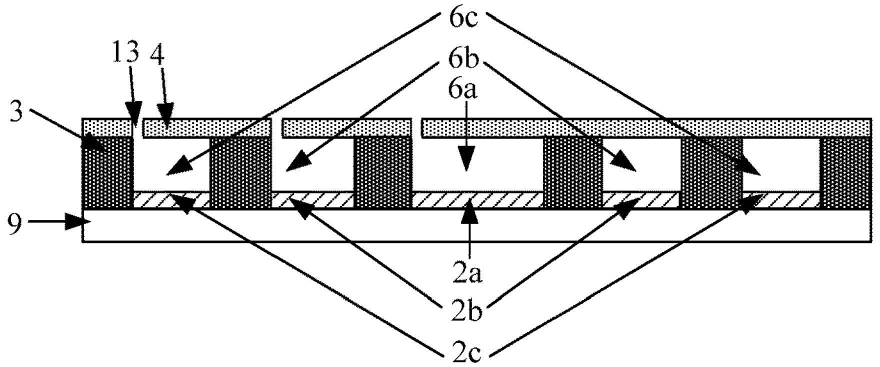
Figure 4F:
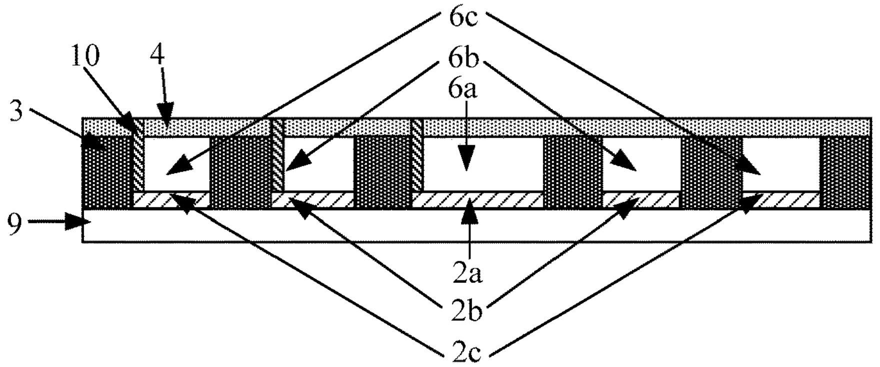
Figure 4G:
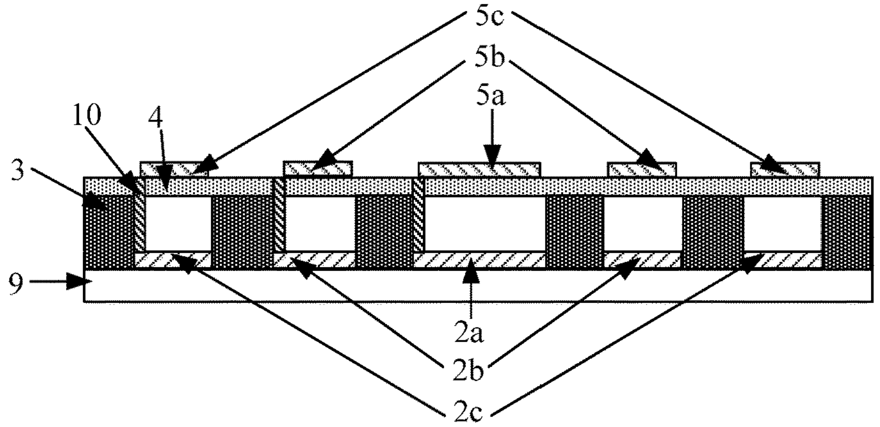

Firstly, referring to FIG. 4*b*, before forming the support pattern and the vibrating diaphragm pattern, a sacrificial pattern 11 is formed on a side of the first central electrode 2*a* and the first annular electrodes 2*b*, 2*c* distal to the base substrate 9. Then, as shown in FIG. 4*c*, a support and vibrating diaphragm material film 304 is formed on a side of the sacrificial pattern 11 and a side of the sacrificial pattern 11 distal to the base substrate 9. Then, referring to FIG. 4*d*, a patterning process is performed on a surface of the support and vibrating diaphragm material film 304 distal to the base substrate 9, to obtain the support pattern 3 and the vibrating diaphragm pattern 4, the support pattern 3 is located on the side of the sacrificial pattern 11, the vibrating diaphragm pattern 4 is located on the side of the sacrificial pattern 11 distal to the base substrate 9, and release holes 13 are formed in the vibrating diaphragm pattern 4. Next, referring to FIG. 4*e*, the sacrificial pattern 11 is removed through the release holes 13 by an etching process to obtain the vibrating cavities 6*a*, 6*b*, 6*c*, the support pattern 3 is encircled to form the central vibrating cavity 6*a* and annular vibrating cavities 6*b*, 6*c* surrounding the central vibrating cavity 6*a*, and the central vibrating cavity 6*a* and the annular vibrating cavities 6*b*, 6*c* are respectively vibrating cavities in the central acoustic transduction unit and the annular acoustic transduction units. Finally, referring to FIG. 4*f*, filling patterns 10 are formed to seal the vibrating cavities 6.

The material of the sacrificial patterns 11 may be selected according to specific requirement. It is required that the vibrating diaphragm pattern, the support pattern, the electrodes, and the like are not damaged in the subsequent process of removing the sacrificial pattern 11. The material of the sacrificial pattern 11 may be a metal (e.g., aluminum, molybdenum, copper, etc.), a metal oxide (e.g., ITO, etc.), an insulating material (e.g., silicon dioxide, silicon nitride, photoresist, etc.), or the like.

In some embodiments, the support pattern 3 and the vibrating diaphragm pattern 4 may also be formed based on different material films and different patterning processes. For example, a support material film may be deposited, and then the patterning process may be performed on the support material film to obtain the support pattern 3. Then, a vibrating material film is deposited, and then a patterning process is performed on the vibrating material film to obtain the vibrating pattern 4, which is not limited in the present disclosure.

Step S103, forming a second central electrode and at least one second annular electrode surrounding the second central electrode on a side of the vibrating diaphragm pattern distal to the base substrate.

Referring to FIG. 4*g*, a second conductive material film is formed on the base substrate, and then the patterning process is performed on the second conductive material film to obtain patterns of the second central electrode 5*a* and the second annular electrodes 5*b* and 5*c*. The second central electrode 5*a* is provided opposite to the first central electrode 2*a*, and the second annular electrodes 5*b* and 5*c* are provided opposite to the corresponding first annular electrodes 2*b* and 2*c*. The second central electrode 5*a* and the second annular electrodes 5*b* and 5*c* are the second electrodes of the central acoustic transduction unit and the annular acoustic transduction units, respectively.

In some embodiments, a pattern of the connection electrodes 12 may also be simultaneously formed during the patterning process of the second conductive material film.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. An acoustic transduction structure, comprising: a base substrate and at least two acoustic transduction units on the base substrate, wherein, the at least two acoustic transduction units comprise: a central acoustic transduction unit and at least one annular acoustic transduction unit around and spaced apart from the central acoustic transduction unit;

wherein the at least one annular acoustic transduction unit comprises a plurality of annular acoustic transduction units; and the plurality of annular acoustic transduction units are provided on the base substrate around the central acoustic transduction unit and are sequentially provided along a direction away from the central acoustic transduction unit;

wherein each of the at least two acoustic transduction units comprises:

a first electrode on the base substrate;

a support pattern on a side of the first electrode distal to the base substrate, wherein the support pattern surrounds to form a vibrating cavity of the acoustic transduction unit;

a vibrating diaphragm pattern on a side of the support pattern distal to the first electrode, and configured to vibrate in the vibrating cavity; and a second electrode on a side of the vibrating diaphragm pattern distal to the first electrode, and opposite to the first electrode, wherein shapes of orthographic projections of the first electrode, the second electrode and the vibrating cavity of the central acoustic transduction unit on the base substrate each are a circular shape, and/or shapes of orthographic projections of the first electrode, the second electrode and the vibrating cavity in each of the plurality of annular acoustic transduction units on the base substrate each are an annular shape;

the orthographic projection of the first electrode of each of the plurality of annular acoustic transduction units on the base substrate surrounds the orthographic projection of the first electrode in the central acoustic transduction unit on the base substrate;

the orthographic projection of the vibrating cavity of each of the plurality of annular acoustic transduction units on the base substrate surrounds the orthographic projection of the vibrating cavity of the central acoustic transduction unit on the base substrate; and the orthographic projection of the second electrode of each of the plurality of annular acoustic transduction units on the base substrate surrounds the orthographic projection of the second electrode of the central acoustic transduction unit on the base substrate;

wherein the first electrode of the central acoustic transduction unit is in a same layer as the first electrodes in the annular acoustic transduction units;

the support pattern of the central acoustic transduction unit is in a same layer as the support patterns of the plurality of annular acoustic transduction units;

the vibrating diaphragm pattern of the central acoustic transduction unit is in a same layer as the vibrating diaphragm patterns of the plurality of annular acoustic transduction units; and the second electrode of the central acoustic transduction unit is in a same layer as the second electrodes of the plurality of annular acoustic transduction units, and the acoustic transduction structure further comprises: an insulating layer and a signal wiring layer, wherein the signal wiring layer is between the base substrate and the first electrodes, the insulating layer is between the signal wiring layer and the first electrodes, and the insulating layer has a plurality of vias therein; and the signal wiring layer comprises: a plurality of signal wirings, and the first electrode of each of the at least two acoustic transduction units is connected with a corresponding one of the plurality of signal wirings through a corresponding one of the plurality of vias.

2. The acoustic transduction structure of claim 1, wherein the annular shape is a circular ring, an elliptical ring or a rectangular ring.

3. The acoustic transduction structure of claim 1, further comprising: a connection electrode connecting two second electrodes of any two adjacent acoustic transduction units of the at least two acoustic transduction units, and on a side of the vibrating diaphragm pattern distal to the first electrode.

4. The acoustic transduction structure of claim 3, wherein the connection electrode is in a same layer as the second electrodes of the at least two acoustic transduction units.

5. The acoustic transduction structure of claim 1, wherein orthographic projections of the vibrating cavities of any two adjacent acoustic transduction units of the at least two acoustic transduction units on the base substrate are spaced apart from each other by a predetermined distance.

6. An acoustic transduction structure, comprising: a base substrate and at least two acoustic transduction units on the base substrate, wherein, the at least two acoustic transduction units comprise: a central acoustic transduction unit and at least one annular acoustic transduction unit around and spaced apart from the central acoustic transduction unit;

wherein the at least one annular acoustic transduction unit comprises a plurality of annular acoustic transduction units; and the plurality of annular acoustic transduction units are provided on the base substrate around the central acoustic transduction unit and are sequentially provided along a direction away from the central acoustic transduction unit;

wherein each of the at least two acoustic transduction units comprises:

a first electrode on the base substrate;

a support pattern on a side of the first electrode distal to the base substrate, wherein the support pattern surrounds to form a vibrating cavity of the acoustic transduction unit;

a vibrating diaphragm pattern on a side of the support pattern distal to the first electrode, and configured to vibrate in the vibrating cavity; and a second electrode on a side of the vibrating diaphragm pattern distal to the first electrode, and opposite to the first electrode, wherein shapes of orthographic projections of the first electrode, the second electrode and the vibrating cavity of the central acoustic transduction unit on the base substrate each are a circular shape, and/or shapes of orthographic projections of the first electrode, the second electrode and the vibrating cavity in each of the plurality of annular acoustic transduction units on the base substrate each are an annular shape;

the orthographic projection of the first electrode of each of the plurality of annular acoustic transduction units on the base substrate surrounds the orthographic projection of the first electrode in the central acoustic transduction unit on the base substrate;

the orthographic projection of the vibrating cavity of each of the plurality of annular acoustic transduction units on the base substrate surrounds the orthographic projection of the vibrating cavity of the central acoustic transduction unit on the base substrate; and the orthographic projection of the second electrode of each of the plurality of annular acoustic transduction units on the base substrate surrounds the orthographic projection of the second electrode of the central acoustic transduction unit on the base substrate; and wherein orthographic projections of the vibrating cavities of any two adjacent acoustic transduction units of the at least two acoustic transduction units on the base substrate are spaced apart from each other by a predetermined distance; and wherein the predetermined distance between the orthographic projections of the vibrating cavities of any two adjacent acoustic transduction units on the base substrate satisfies: $0.4\lambda \leq d \leq 0.6\lambda$, d is the predetermined distance, and $\lambda$ is a wavelength of an acoustic wave emitted by the acoustic transduction structure.

7. The acoustic transduction structure of claim 6, wherein an orthographic projection of release holes of the vibrating cavities of the central acoustic transduction unit and the plurality of annular acoustic transduction units on the base substrate and an orthographic projection of filling patterns in the release holes on the base substrate are on a symmetrical axis of the central acoustic transduction unit and the plurality of annular acoustic transduction units, and are on a side of the vibrating cavities in the central acoustic transduction unit and the plurality of annular acoustic transduction units distal to the central acoustic transduction unit, respectively.

8. The acoustic transduction structure of claim 3, wherein the connection electrode is on a symmetrical axis of the central acoustic transduction unit and the plurality of annular acoustic transduction units.

9. A manufacturing method of an acoustic transduction structure, wherein the acoustic transduction structure comprises a base substrate and at least two acoustic transduction units on the base substrate, and the at least two acoustic transduction units comprise: a central acoustic transduction unit and at least one annular acoustic transduction unit around and spaced apart from the central acoustic transduction unit, the manufacturing method comprises steps of:

forming at least two acoustic transduction units on a base substrate such that the at least two acoustic transduction units comprise: a central acoustic transduction unit and at least one annular acoustic transduction unit around and spaced apart from the central acoustic transduction unit; and the step of forming at least two acoustic transduction units on a base substrate comprises steps of:

forming a first central electrode and at least one first annular electrode around and spaced apart from the first central electrode on the base substrate, wherein the first central electrode and the at least one first annular electrode are first electrodes of the central acoustic transduction unit and the at least one annular acoustic transduction unit, respectively, and the at least one first annular electrode is spaced apart from each other in a direction away from the first central electrode;

forming a support pattern and a vibrating diaphragm pattern on a side of the first central electrode and the at least one first annular electrode distal to the base substrate, wherein the support pattern surrounds to form a central vibrating cavity and at least one annular vibrating cavity around the central vibrating cavity, and the central vibrating cavity and the at least one annular vibrating cavity are respectively vibrating cavities of the central acoustic transduction unit and the at least one annular acoustic transduction unit; and forming a second central electrode and at least one second annular electrode around the second central electrode on a side of the vibrating diaphragm pattern distal to the base substrate, wherein the second central electrode and the at least one second annular electrode are second electrodes of the central acoustic transduction unit and the at least one annular acoustic transduction unit, respectively.

10. The manufacturing method of claim 9, wherein while forming a second central electrode and at least one second annular electrode around the second central electrode on a side of the vibrating diaphragm pattern distal to the base substrate, the manufacturing method further comprises forming a connection electrode such that the connection electrode connects two second electrodes of any adjacent two of the at least two acoustic transduction units.

11. The manufacturing method of claim 9, wherein the step of forming a support pattern and a vibrating diaphragm pattern on a side of the first central electrode and the at least one first annular electrode distal to the base substrate comprises steps of:

forming a plurality of sacrificial patterns on a side of the first central electrode and the at least one first annular electrode distal to the base substrate, respectively;

forming a support and vibrating diaphragm material film on side surfaces of the plurality of sacrificial patterns and on a surface of the plurality of sacrificial patterns distal to the base substrate, and performing a patterning process on the support and vibrating diaphragm material film to form the support pattern and the vibrating diaphragm pattern;

forming a plurality of release holes of the central acoustic transduction unit and the at least one annular acoustic transduction unit in the vibrating diaphragm pattern;

removing the plurality of sacrificial patterns via the plurality of release holes to obtain vibrating cavities of the central acoustic transduction unit and the at least one annular acoustic transduction unit; and forming filling patterns in the plurality of release holes to seal the vibrating cavities of the central acoustic transduction unit and the at least one annular acoustic transduction unit.

12. The manufacturing method of claim 9, wherein the step of forming a support pattern and a vibrating diaphragm pattern on a side of the first central electrode and the at least one first annular electrode distal to the base substrate comprises steps of:

forming a plurality of sacrificial patterns on a side of the first central electrode and the at least one first annular electrode distal to the base substrate, respectively;

forming a support material film on side surfaces of the plurality of sacrificial patterns, and performing a patterning process on the support material film to obtain the support patterns;

forming a vibrating material film on a surface of the plurality of sacrificial patterns distal to the base substrate, and performing a patterning process on the vibrating material film to obtain the vibrating pattern;

forming a plurality of release holes of the central acoustic transduction unit and the at least one annular acoustic transduction unit in the vibrating diaphragm pattern;

removing the plurality of sacrificial patterns via the plurality of release holes to obtain vibrating cavities of the central acoustic transduction unit and the at least one annular acoustic transduction unit; and forming filling patterns in the plurality of release holes to seal the vibrating cavities of the central acoustic transduction unit and the at least one annular acoustic transduction unit.

13. An acoustic transducer, comprising: the acoustic transduction structure of claim 1.

14. An acoustic transducer, comprising: the acoustic transduction structure of claim 6.

* * * * *